Oct. 6, 1931.  R. L. GOETZENBERGER  1,825,659
DATA COMPUTER
Filed Sept. 29, 1926  2 Sheets-Sheet 1

Inventor
R. L. Goetzenberger
By W. N. Roach
Attorney

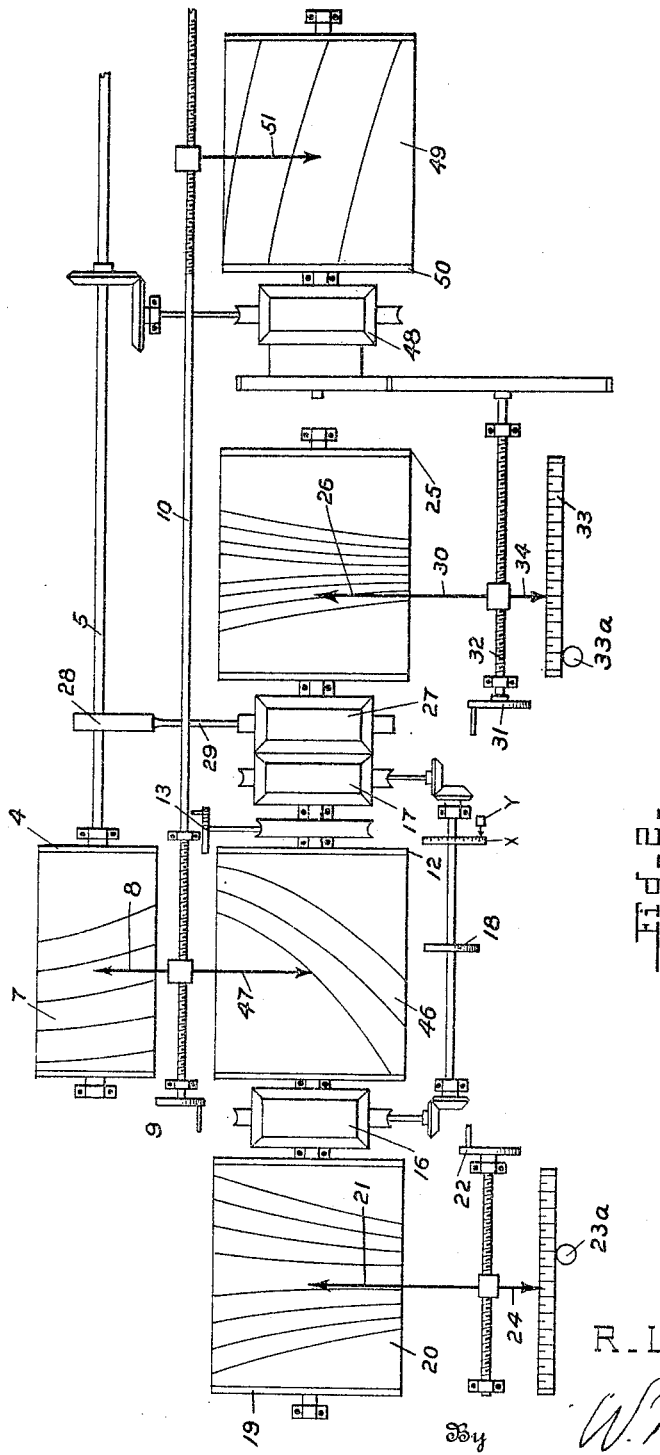

Patented Oct. 6, 1931

1,825,659

UNITED STATES PATENT OFFICE

RALPH L. GOETZENBERGER, OF PHILADELPHIA, PENNSYLVANIA

DATA COMPUTER

Application filed September 29, 1926. Serial No. 138,561.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

The subject of this invention is a data computer based on the linear speed method of fire control for anti-aircraft gunnery.

In establishing a defense against aircraft with the lighter, more mobile weapons such as the machine gun and the automatic 37 mm. gun a fire control apparatus should be used which is of a centralized, self contained character, requiring a minimum of personnel and capable of being brought into operation in the shortest possible time.

The systems heretofore used have been devised for guns of 75 mm. caliber and over and while satisfactory for fixed defenses they can not be set up with sufficient rapidity for the present purpose nor are they adapted to obtain the data required for the lighter guns whose effectiveness is calculated more by the volume of fire delivered than by the accuracy of fuse settings.

The device constituting the subject of the invention pertains more specifically to that class of computing apparatus designed especially for the solution of such equations as the following:

$$L = \frac{Et}{R} \sin\text{ alpha}$$

$$V = \frac{Et}{R} \sin\text{ S cosin alpha}$$

where L and V represent respectively lateral and vertical deflection corrections E = engine speed of the target;
t = time of flight of projectile;
R = slant range;
S = angular height or angle of site;
Alpha = angle of approach or presentation of the target.

Each of these equations is resolved logarithmically and is based on the plane of sight reference of the gun sights.

The apparatus is characterized principally by an arrangement whereby the value of engine speed is combined with the value of time of flight, angle of approach and slant range to obtain in one case lateral deflection correction and in another case by the further introduction of the value of log sin S to obtain vertical deflection. The vertical deflection correction may be then used in resolving the angle of superelevation to which it may be added or it may be used in resolving the angle of quadrant elevation.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings wherein:

Fig. 2 is a similar view of a computer for determining lateral deflection correction and quadrant elevation.

Figure 1:
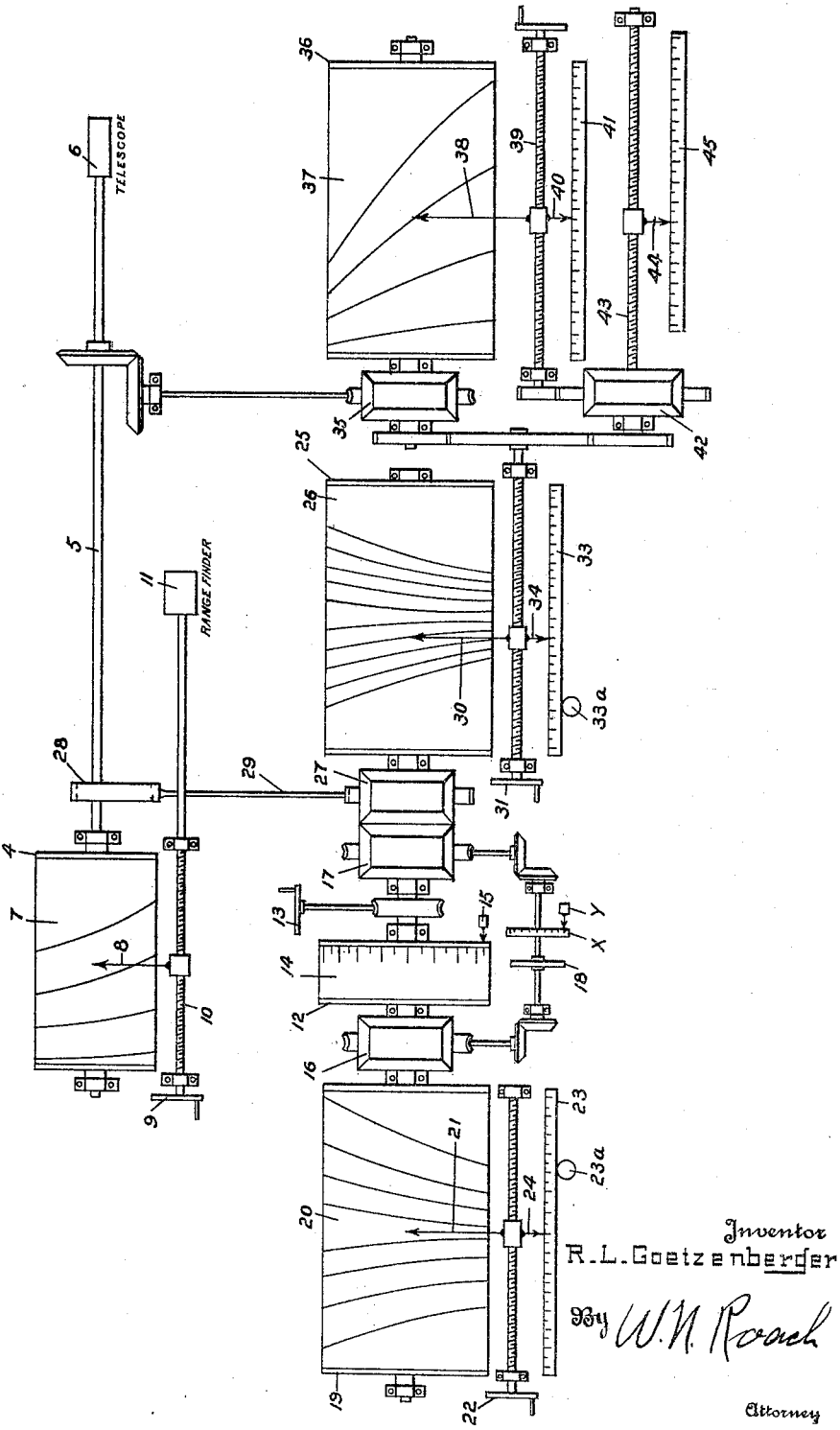
Fig. 1 is a more or less diagrammatic view of a data computer for determining lateral deflection correction and total vertical deflection which is the summation of the vertical deflection correction and the angle of superelevation.

Referring to the drawings by numerals of reference:

The apparatus illustrated in Fig. 1 includes a cylinder 4 the rotation of which is a function of angular height controlled by the shaft 5 from the sighting telescope 6 and on the cylinder is a chart 7 plotted with a set of time of flight curves for the particular gun for which data is to be obtained. A pointer 8 is movable across a generatrix of the cylinder in function of slant range either by means of the hand wheel 9 or by actual connection of the shaft 10 with a range finder indicated at 11. The reading of the curve on the chart 7 indicates the time of flight to the target at a particular slant range and may be registered as $\log \frac{t}{R}$ on a cylinder 12 by rotating it through the hand wheel 13 until the value of the time of flight as determined registers on the scale 14 against a fixed index 15.

To this rotation must be added the log of the value of the engine speed E and the provision for introducing this value consists of differential gearing 16 and 17 at each end of the cylinder 12 actuated by rotating a common hand wheel 18 to settings of speed on scale X registering against fixed index Y.

Cylinder 19 adjacent to the differential 16 and bearing a chart 20 of curves of constant angle of approach (alpha) therefor rotates proportionately to log $\frac{Et}{R}$ and pointer 21 governed by the hand wheel 22 when brought to the announced curve of alpha gives a direct indication in mils of lateral deflection correction on scale 23 by the pointer 24.

On the opposite side and receiving its motion through the differential 17 is another cylinder 25 bearing a chart 26 of constant angle of approach curves and rotating simultaneously with the cylinder 19 through the same angle plus that caused by introducing the function of log sin S. This added rotation is imparted through a differential 27 by means of a connection with the shaft 5 whose rotation is a function of angle of site. This connection comprises a cam 28 of sinusoidal form which causes a cam follower 29 to actuate the satellite gear of the differential. Therefore when pointer 30 is moved across the cylinder 25 through rotation of hand wheel 31 on shaft 32 until it is brought to the announced curve of alpha, an indication of vertical deflection correction in mils is indicated on the scale 33 of pointer 34.

Secondary corrections may be taken care of by moving the scales 23 and 33 through the hand wheels 23a and 33a.

In resolving the angle of superelevation defined as the additional elevation required to allow for the curve of the trajectory, the algebraic sum of the angular height and the vertical deflection correction are required. Accordingly the movements of the shafts 5 and 32 which are respectively proportionate to these values are combined through a differential 35 which results in rotating cylinder 36 in function of future angular height. On this cylinder is a chart 37 of curves of constant slant range and when a pointer 38 on a shaft 39 is moved across the cylinder to the announced slant range a second pointer 40 movable with the first pointer and readable against the scale 41 indicates the angle of superelevation.

The angle of superelevation can be added automatically to the vertical deflection correction by combining the movements of the respective shafts 39 and 32 through the differential 42, the resultant rotation of shaft 43 indicating the total vertical deflection by means of a pointer 44 readable against a scale 45.

In order to obtain a higher degree of precision in resolving the value of $\frac{t}{R}$ cylinder 12 may be enlarged as shown in Fig. 2 and provided with a chart 46 of time of flight curves and a pointer 47 for reading the chart may be connected with the pointer 8 so that it moves in function of slant range.

The apparatus illustrated in Fig. 2 for determining quadrant elevation is identical with that just described insofar as lateral and vertical deflection correction values are concerned, differing only as to one of its drums and its interconnections.

The movements of the shafts 5 and 32 are combined through a differential 48 which results in rotating a cylinder 49 in function of future angular height. This cylinder bears a chart 50 of curves of constant quadrant elevation. On the shaft 10 leading from the range finder is a pointer 51 movable in function of slant range and directly indicating on the chart 50 the quadrant elevation to be sent to the gun.

I claim:

1. In a data computer, a member controllable from a sighting telescope and adapted to be moved proportional to angular height of a target, said member bearing a chart of curves of time of flight, a member movable proportional to slant range and indicating on the preceding member the time of flight, a member adjustable to said determination, means for combining with said member a movement proportional to engine speed, a pair of cylinders bearing curves of constant angle of approach receiving this combined movement, means for indicating lateral deflection correction from one of said cylinders, means for introducing into the other cylinder an additional movement whose function is log sin S, means for indicating vertical deflection correction from said last named cylinder, a member having a movement resulting from combining the functions of angular height and vertical deflection correction, said member bearing a chart of curves of constant slant range, means for indicating from said member the angle of superelevation and means for combining the function of superelevation and vertical deflection correction and indicating the total value.

2. In a data computer, a member controllable from a sighting telescope and adapted to be moved proportional to angular height of a target, said member bearing a chart of curves of time of flight, a member movable proportional to slant range and indicating on the preceding member the time of flight, a member adjustable to said determination, means for combining with said member, a movement proportional to engine speed, a pair of cylinders bearing curves of constant angle of approach receiving this combined movement, means for indicating lateral deflection correction from one of said cylinders, means for introducing into the other cylinder an additional movement whose function is log sin S, means for indicating vertical deflection correction from said last named cylinder, a member having a movement resulting from combining the functions of angular height and vertical deflection correction, said member bearing a chart of curves of constant slant range, and means for indicating from said member the angle of superelevation.

RALPH L. GOETZENBERGER.